(No Model.)
G. H. WELLS, Jr.
ANIMAL TRAP.
No. 486,005. Patented Nov. 8, 1892.
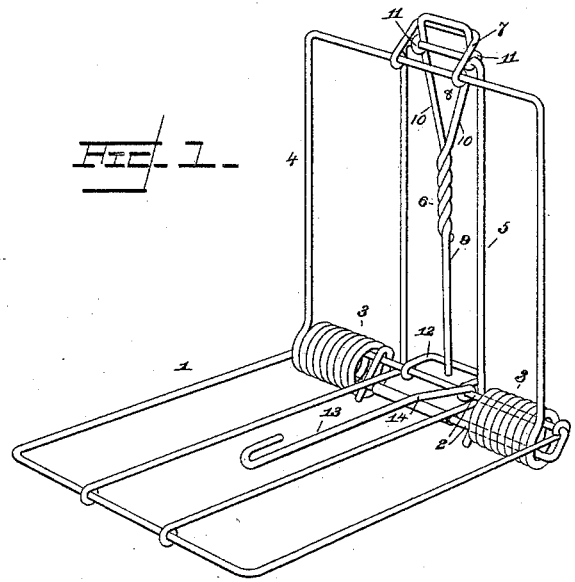
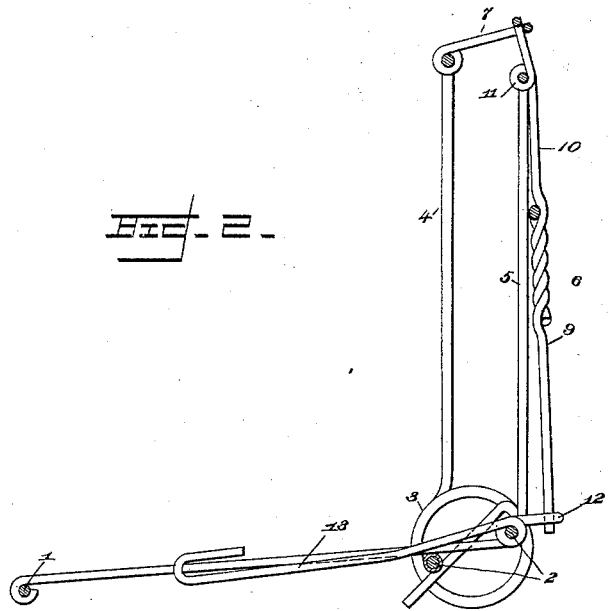
Witnesses
J. H. Siggers
H. W. Riley
Inventor
George H. Wells, Jr.
By his Attorneys,
C. A. Snow & Co.

UNITED STATES PATENT OFFICE.

GEORGE H. WELLS, JR., OF LAKE CHARLES, LOUISIANA, ASSIGNOR OF ONE-HALF TO SOLOMON BLOCH, OF SAME PLACE.

ANIMAL-TRAP.

SPECIFICATION forming part of Letters Patent No. 486,005, dated November 8, 1892.

Application filed June 30, 1892. Serial No. 438,608. (No model.)

*To all whom it may concern:*

Be it known that I, GEORGE H. WELLS, Jr., a citizen of the United States, residing at Lake Charles, in the parish of Calcasieu and State of Louisiana, have invented a new and useful Animal-Trap, of which the following is a specification.

The invention relates to improvements in animal-traps.

The object of the present invention is to improve and increase the efficiency of animal-traps and to provide one which will be simple and inexpensive in construction and which will be easy to set and exceedingly sensitive, so that the slightest touch of the trigger will spring it.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention and shown set. Fig. 2 is a central longitudinal sectional view.

Like numerals of reference indicate corresponding parts in both the figures of the drawings.

1 designates a main frame or base connected at the rear by a transverse brace 2, around which pass coils 3 of a striking-wire 4, and the said frame or base 1 is supported by a longitudinal brace consisting of a horizontal portion of an L-shaped frame 5, which receives the rear portion of the transverse brace 2 in its angle, and is provided at the front end of its horizontal portion with eyes to receive the main frame or base, and has its vertical portion forming a support for a trigger-lever or trip 6. The striking-wire is provided at its transverse portion with a rectangular loop 7, which is provided with eyes to receive the striking-wire.

The trigger or trip lever 6 is constructed of a single piece of wire, and consists of a triangular upper portion 8 and a shank or stem 9, which is twisted below the loop to strengthen the lever. The diverging sides 10 of the loop portion 8 of the trigger are provided with eyes 11, which receive the upper cross-piece of the L-shaped supporting-frame and fulcrum the lever thereon, and the upper or loop portion 8 of the lever is adapted to be engaged by the hinged loop 7 of the striking-wire to hold the latter elevated to set the trap. The lower end of the stem of the lever is engaged when the trap is set by a rectangular loop 12 of a trigger 13, which is constructed of wire, and consists of the said loop 12 and a stem, which forms a continuation of one side of the loop 12, and which is provided with an inward bend 14 to bring the body of the stem at the middle of the trap, and which is provided at its front end with a hook to receive a suitable bait. The sides of the loop 12 are provided with eyes to receive the rear portion of the transverse brace 2, which forms a pivot for the bait-trigger.

It will be seen that the trap is exceedingly simple and inexpensive in construction, that it may be readily set by bringing the loop of the striking-wire over the upper end of the lever and that of the trigger in engagement with the lower end of the lever, and that the trap is exceedingly sensitive, as the least movement of the trigger will carry its loop out of engagement with the lower end of the lever and spring the trap.

What I claim is—

1. In a trap, the combination of a frame or base, a striking-wire mounted thereon and having coils, a transverse brace receiving the coils, a supporting-frame, a lever fulcrumed on the supporting-frame and constructed of wire and provided at its upper end with a triangular loop having eyes to receive the supporting-frame, and a bait-trigger provided with eyes to receive the transverse brace and having a loop arranged to engage the lower end of the lever, substantially as described.

2. In a trap, the combination of a base, a transverse brace, an L-shaped supporting-frame having a horizontal portion extending longitudinally of the base and having a vertical portion rising from the rear of the base, a striking-wire having coils disposed on the transverse brace, a loop hinged to the striking-wire, a lever fulcrumed on the supporting-frame and constructed of a single piece of wire and consisting of a triangular portion having eyes at its sides to receive the supporting-frame and a depending stem twisted below the loop, and a bait-trigger constructed of wire and consisting of a loop having eyes to receive the transverse brace, and a stem forming a continuation of one side of the loop and being bent inward and provided at its front end with a bait-hook, substantially as described.

In testimony that I claim the foregoing as my own I have hereto affixed my signature in the presence of two witnesses.

GEO. H. WELLS, JR.

Witnesses:
    T. C. MCCAIN,
    W. F. FOSTER.